Figure 1:
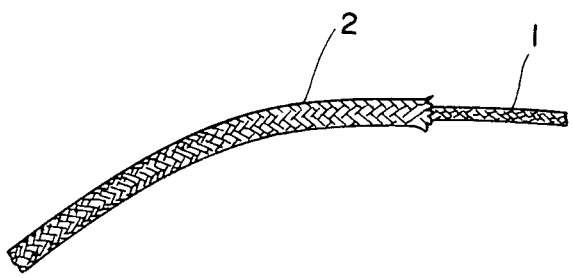

United States Patent [19]

Nakanishi et al.

[11] Patent Number: 4,550,938

[45] Date of Patent: Nov. 5, 1985

[54] FISHING LINE KNOT

[75] Inventors: Hitoshi Nakanishi, Hyogo; Hiroyuki Ogura, Kyoto, both of Japan

[73] Assignee: Yotsuami Limited, Hyogo, Japan

[21] Appl. No.: 630,225

[22] Filed: Jul. 12, 1984

[30] Foreign Application Priority Data

Jul. 25, 1983 [JP] Japan .................. 58-116001[U]

[51] Int. Cl.$^4$ .................. D04G 5/00; B05G 1/18
[52] U.S. Cl. .................. 289/1.2; 289/1.5; 403/223; 403/291; 43/44.98
[58] Field of Search ........... 43/44.98; 403/291, 223, 403/206; 289/1.2, 1.5, 17, 18; 57/22, 26; 24/122.3, 129 R; 74/501 R

[56] References Cited

U.S. PATENT DOCUMENTS

| | | | |
|---|---|---|---|
| 469,015 | 2/1892 | Hemenway | 43/44.98 |
| 1,296,057 | 3/1919 | Ellsworth | 43/44.98 |
| 3,841,015 | 10/1974 | Gregory | 43/44.98 |
| 3,888,037 | 6/1975 | Warthen | 43/44.98 |
| 4,321,854 | 3/1982 | Foote et al. | 43/44.98 |

FOREIGN PATENT DOCUMENTS

| | | | |
|---|---|---|---|
| 689937 | 9/1930 | France | 403/291 |
| 269000 | 4/1928 | Italy | 403/291 |
| 2058134 | 12/1982 | Japan | 43/44.98 |

Primary Examiner—Nicholas P. Godici
Assistant Examiner—M. Jordan
Attorney, Agent, or Firm—Joseph W. Farley

[57] ABSTRACT

A fishing line comprising a core line and a tubular outer line formed of synthetic fibers and sheathing the core line, the core line being withdrawable from the outer line. A conventional fishing line can be firmly connected to a leader with the outer line by withdrawing the core line from the outer line, then inserting one end of the fishing line and one of the leader into opposite ends of the outer line and tying each of the laps of the outer line over the fishing line and the leader into a single knot. The tied portions are as high as at least 90% in tensile strength ratio.

6 Claims, 5 Drawing Figures

FISHING LINE KNOT

This invention relates to an improvement in connecting a fishing line to a leader.

Fishing lines generally known include those made of nylon or fluorocarbon. A length of such a fishing line is tied to another, for example, by a figure 8 knot, leader knot, blood knot or surgeon knot. The tensile strength ratio of the tied portion of two lengths of a fishing line (i.e. the ratio of the tensile strength of the tied portion to that of the fishing line itself) varies with the material and thickness of the fishing line, the kind of knot used, the skill of the person who tied the line, etc. Of the above-mentioned knots, the figure 8 knot has the highest tensile strength ratio. However, even the greatest tensile strength ratio provided by the figure 8 knot is 70-odd percent and is not fully satisfactory.

Accordingly an object of the present invention is to provide a fishing line by which two lengths of conventional fishing line can be easily tied together into a knot having a high tensile strength ratio.

To fulfill the above object, the present invention provids a fishing line comprising a core line and a tubular outer line formed of synthetic fibers and sheathing the core line, the core line being withdrawable from the outer line.

Various features and advantages of the present invention will become apparent from the following description of an embodiment with reference to the accompanying drawings, in which:

FIG. 1 is a fragmentary perspective view showing a fishing line embodying the invention; and FIG. 2 to FIG. 5 are views showing stepwise a method of connecting a conventional fishing line to a leader with use of the fishing line of the invention.

With reference to FIG. 1, a core line 1 is covered or sheathed with a tubular outer line 2. The core line 1 is withdrawable from the outer line 2. The core line 1 and the outer line 2 are both formed, for example, of polyester, aliphatic polyamide, aromatic polyamide or like synthetic fibers.

The fishing line of the above structure is used in the following manner.

Figure 2:
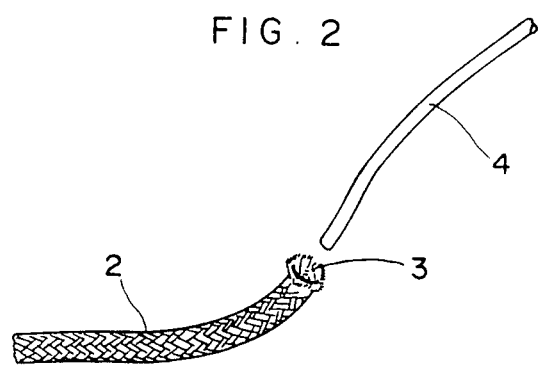
Figure 3:
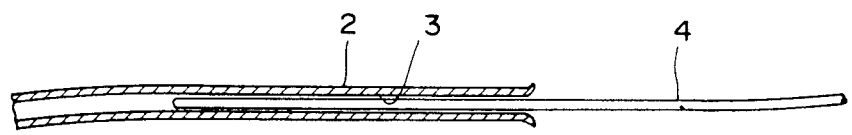
Figure 4:
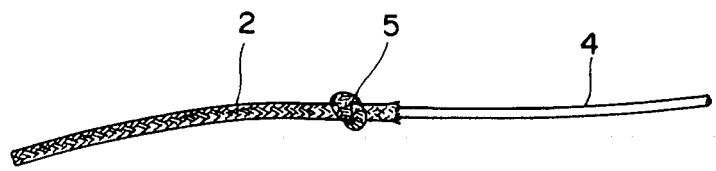
Figure 5:
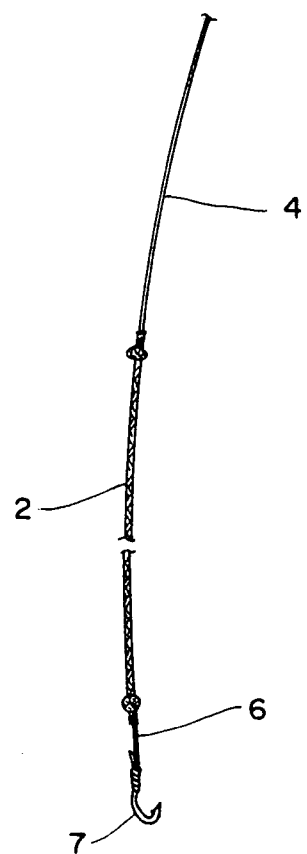

First, the core line 1 is withdrawn from the outer line 2 of the present fishing line cut to a suitable length, and one end of a monofilament fishing line 4 of nylon or fluorocarbon is inserted by a suitable length into the hollow space 3 of the outer line 2 at its one end as seen in FIGS. 2 and 3. Next, the outer line 2 and the fishing line 4 are tied together into a single knot 5 at the lap as seen in FIG. 4. In the same manner as above, the other end of the outer line 2 and a leader 6 (made of nylon or fluorocarbon) are tied together as shown in FIG. 5. Thus, the fishing line 4 is tightly connected to the leader 6 by the outer line 2. Indicated at 7 is a fishhook attached to the other end of the leader 6.

As shown in FIG. 2, each end of the outer line 2, which is formed by braiding or weaving, is likely to fray out. To prevent this, the outer line 2 may be externally coated with polyester, polyamide or like resin. For such coating, the outer line 2, before being cut into short lengths, is passed through a bath of resin solution with the core line 1 sheathed with the outer line 2 and is thereafter dried.

Metal wires are of course usable as the fishing line 4 and the leader 6. The core line 1 withdrawn from the outer line 2 is usable also as one of the lines to be connected together, for example, as the fishing line 4. Furthermore, the present fishing line having the core line 1 sheathed with the outer line 2 may be used as wound on a reel or as attached directly to a fishing rod.

Since the core line 1 is intended to enable the outer line 2 to retain its hollow space 3 in shape, the core line 1 need not always be braided or woven from synthetic fibers. For example, polyester, nylon or fluorocarbon monofilaments, metal wires, etc. are usable as core lines.

The fishing line of the present invention was checked for its advantage as a connecting line by tying various fishing lines by conventional methods and the method of the invention and testing the tied portions for tensile strength ratio. The results are given in the table below.

TABLE

| Line to be tied Diameter | A (kg) | FIG. 8 knot B (kg) | C (%) | Leader knot B (kg) | C (%) | Blood knot B (kg) | C (%) | Surgeon knot B (kg) | C (%) | Method of invention B (kg) | C (%) | D (mm) |
|---|---|---|---|---|---|---|---|---|---|---|---|---|
| Fluorocarbon line 0.235 mm | 4.0 | 3.0 | 75.0 | 2.2 | 55.0 | 2.7 | 67.5 | 3.0 | 75.0 | 3.8 | 95.0 | 0.405 |
| Nylon line 0.285 mm | 6.4 | 5.0 | 78.1 | 2.3 | 35.9 | 3.4 | 53.1 | 4.3 | 67.1 | 6.3 | 98.4 | 0.405 |
| Nylon line 0.330 mm | 8.6 | 6.6 | 76.7 | 3.1 | 36.0 | 4.0 | 46.5 | 5.8 | 67.4 | 8.3 | 96.5 | 0.405 |
| Nylon line 0.370 mm | 11.0 | 8.2 | 74.5 | 4.2 | 38.1 | 5.1 | 46.3 | 6.7 | 60.9 | 10.7 | 97.2 | 0.405 |
| Nylon line 0.405 mm | 11.6 | 8.6 | 74.1 | 4.4 | 37.9 | 6.2 | 53.4 | 7.8 | 67.2 | 10.9 | 93.9 | 0.405 |
| Nylon line 0.435 mm | 14.6 | 10.5 | 71.9 | * | * | 7.1 | 48.6 | 9.6 | 65.7 | 14.2 | 97.2 | 0.639 |
| Nylon line 0.470 mm | 16.2 | 11.5 | 70.9 | 5.2 | 32.0 | 8.0 | 49.3 | 10.2 | 62.9 | 15.6 | 96.2 | 0.639 |
| Fluorocarbon line 0.520 mm | 15.0 | 11.5 | 76.6 | 8.9 | 59.3 | 10.0 | 66.6 | 10.9 | 72.6 | 13.9 | 92.6 | 0.639 |
| Nylon line 0.570 mm | 22.4 | 16.5 | 73.6 | 11.6 | 51.7 | 12.2 | 54.4 | 14.5 | 64.7 | 21.8 | 97.3 | 0.825 |
| Nylon line 0.620 mm | 26.0 | 18.5 | 71.1 | 13.8 | 53.0 | 12.5 | 48.0 | 16.8 | 64.6 | 25.7 | 98.8 | 0.825 |
| Nylon line | 37.0 | 24.0 | 64.8 | * | * | 16.0 | 43.2 | 18.2 | 49.1 | 34.0 | 91.8 | 0.825 |

TABLE-continued

| Line to be tied Diameter | FIG. 8 knot A (kg) | FIG. 8 knot B (kg) | FIG. 8 knot C (%) | Leader knot B (kg) | Leader knot C (%) | Blood knot B (kg) | Blood knot C (%) | Surgeon knot B (kg) | Surgeon knot C (%) | Method of invention B (kg) | Method of invention C (%) | Method of invention D (mm) |
|---|---|---|---|---|---|---|---|---|---|---|---|---|
| 0.740 mm | | | | | | | | | | | | |

A: The tensile strength of the line to be tied.
B: The tensile strength of the tied portion.
C: Tensile strength ratio = B/A.
D: The thickness of the outer line.
*Lengths of the line slipped and could not be tied, hence not measurable.

The table reveals that the tying method of the invention achieves higher tensile strength ratios than any conventional method for various fishing lines.

What is claimed is:

1. A method of forming a fishing line connection comprising inserting one end of a first fishing line and one end of a second fishing line respectively into one and the other ends of a tubular line and forming a connection between said one end of each fishing line and each end of said tubular line, therein characterized that said connection is provided by forming each end of said tubular line into a single knot to correspondingly form said one end of one of said first and second fishing lines into a single knot within said knot of said tubular line.

2. A method as defined in claim 1 wherein said tubular line is coated with a resin.

3. A method as defined in claim 1 wherein each of said first and second fishing lines comprises a monofilament.

4. A fishing line connection structure comprising a tubular line, a first fishing line having one end inserted into and connected to one end of said tubular line, and a second fishing line having one end inserted into and connected to the other end of said tubular line, therein characterized that each end of said tubular line has a single knot within which said one end of one of said first and second fishing lines has a corresponding single knot.

5. A fishing line connection structure as defined in claim 4 wherein said tubular line is coated with a resin.

6. A fishing line connection structure as defined in claim 4 wherein each of said first and second fishing lines comprises a monofilament.

* * * * *